(No Model.) 3 Sheets—Sheet 1.
F. H. CHIDESTER & S. J. HARMOUNT.
DENTAL VULCANIZING APPARATUS.
No. 359,773. Patented Mar. 22, 1887.
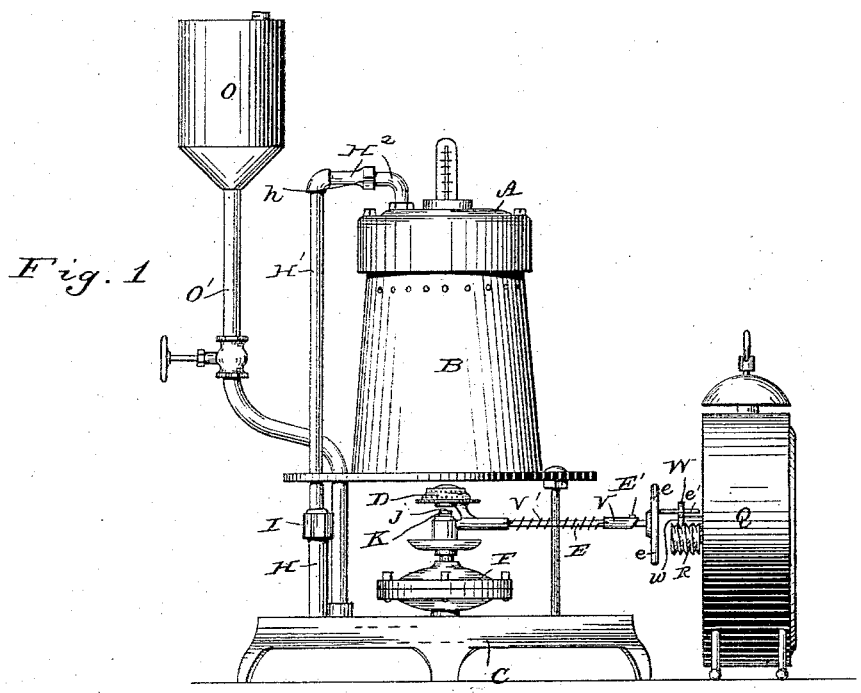
Fig. 1
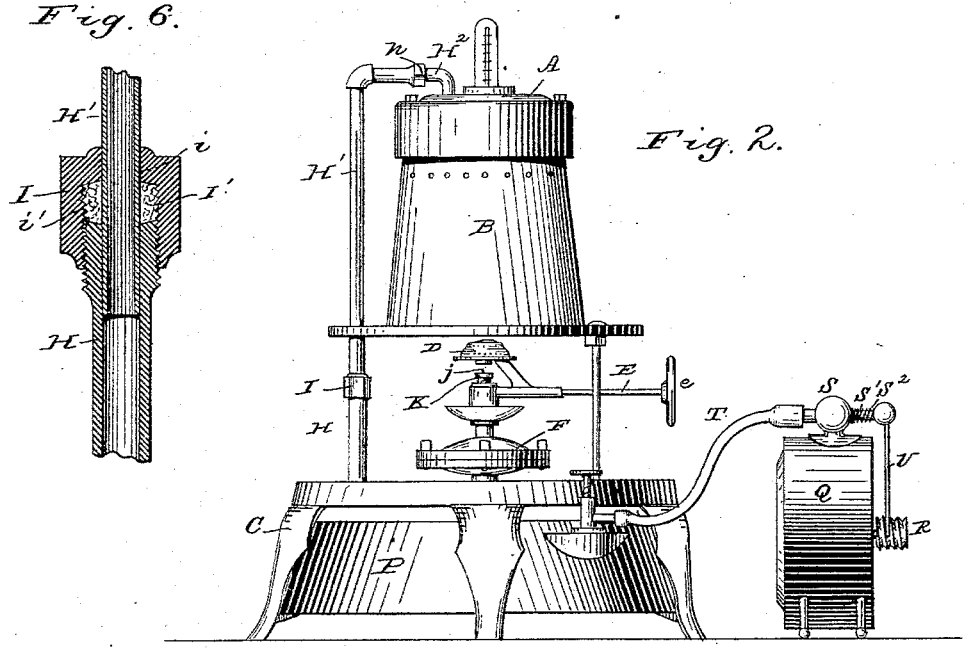
Fig. 6.
Fig. 2.
Witnesses:
J. S. Barker.
J. C. Turner.
Inventors:
Frank H. Chidester, and
Simpson J. Harmount.
by Doubleday & Bliss
Attys.

(No Model.) 3 Sheets—Sheet 2.

F. H. CHIDESTER & S. J. HARMOUNT.
DENTAL VULCANIZING APPARATUS.

No. 359,773. Patented Mar. 22, 1887.

Fig. 5ª.

Witnesses:
J. S. Barker.
J. C. Turner

Inventors:
Frank H. Chidester
and Simpson J. Harmount
by Doubleday & Bliss
Attys (No Model.) 3 Sheets—Sheet 3.
F. H. CHIDESTER & S. J. HARMOUNT.
DENTAL VULCANIZING APPARATUS.
No. 359,773. Patented Mar. 22, 1887.
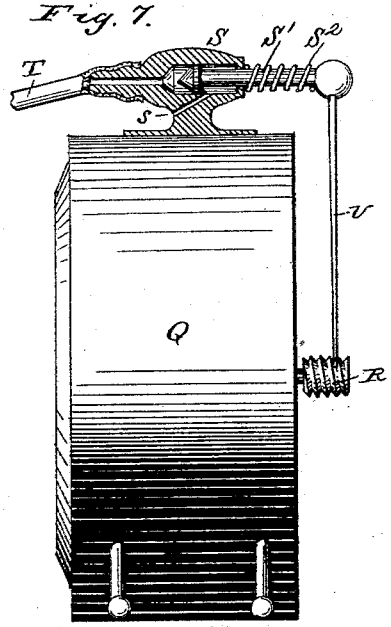
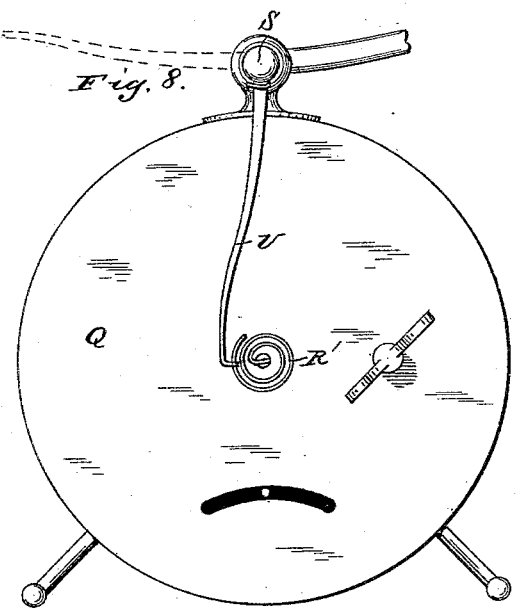
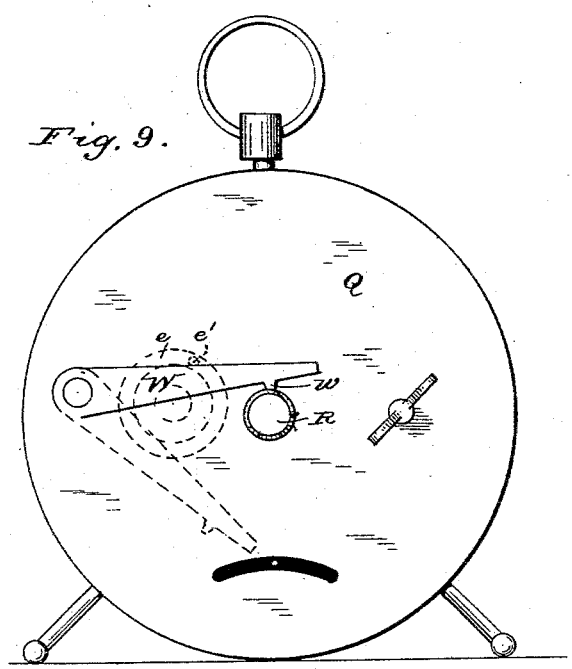
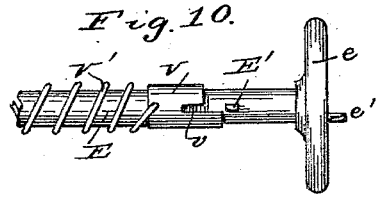
Witnesses:
J. S. Barker
J. C. Turner
Inventors:
Frank H. Chidester
Simpson J. Harmount
by Doubleday & Bliss
Attys.
N. PETERS. Photo-Lithographer, Washington, D. C.

UNITED STATES PATENT OFFICE.

FRANK H. CHIDESTER AND SIMPSON J. HARMOUNT, OF MASSILLON, OHIO.

DENTAL VULCANIZING APPARATUS.

SPECIFICATION forming part of Letters Patent No. 359,773, dated March 22, 1887.

Application filed June 22, 1886. Serial No. 205,909. (No model.)

*To all whom it may concern:*

Be it known that we, FRANK H. CHIDESTER and SIMPSON J. HARMOUNT, citizens of the United States, residing at Massillon, in the county of Stark and State of Ohio, have invented certain new and useful Improvements in Dental Vulcanizing Apparatus, of which the following is a specification, reference being had therein to the accompanying drawings.

Figure 3:
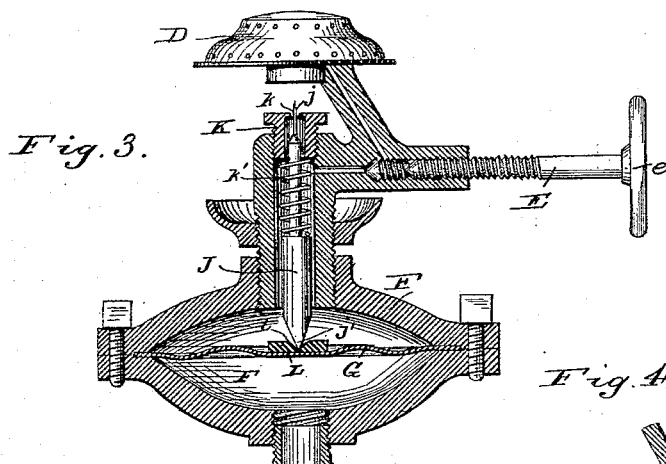
Figure 4:
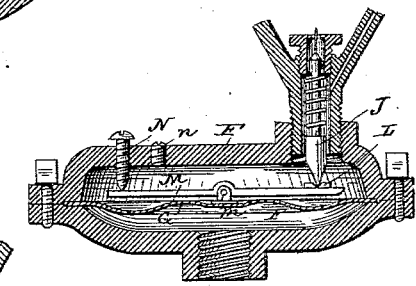
Figure 5:
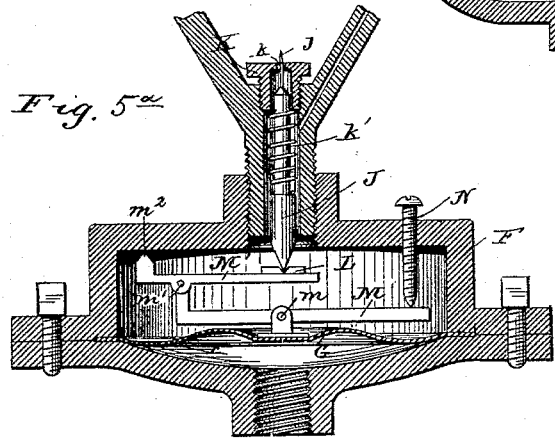
Figure 5:
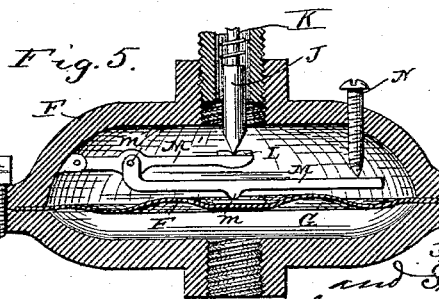

Figure 1 is a side elevation of a dental vulcanizing apparatus having our improvements applied thereto. Fig. 2 is a similar view showing a different form of reservoir from that in Fig. 1, together with certain other differences in construction. Fig. 3 is a sectional view on a somewhat enlarged scale, illustrating the devices for regulating the flame. Fig. 4 is a similar view showing a different form of these devices. Figs. 5 and 5$^a$ show still other forms. Fig. 6 is a detail view in section. Fig. 7 is a side view, partly in section, showing devices for cutting off the flow of vapor and extinguishing the flame. Fig. 8 is a rear view of Fig. 7, illustrating modifications. Fig. 9 is a similar view to Fig. 8, illustrating the devices for automatically regulating the cut off of vapor when an elevated tank, such as shown in Fig. 1, is employed. Fig. 10 is a detail view, enlarged, of part of the devices shown in Fig. 1.

This invention relates to certain improvements in dental vulcanizing apparatus of the general class illustrated in Patents Nos. 300,953 and 315,241, heretofore granted to F. H. Chidester.

In the drawings, A represents the vulcanizer, which may be of any approved style. B represents the hood or surrounding jacket, and C the supporting-frame upon which these parts are mounted.

D represents a burner, situated below the vulcanizer, it being of a style adapted to burn gasoline, although, so far as our invention is concerned, a gas-burner might be substituted in place of the one shown.

E represents a screw rod or stem provided with a hand-wheel, *e*, by which the flow of vapor to the burner may be regulated or entirely cut off, as is usual in this class of burners.

In the aforesaid Patent No. 300,953 were shown and described devices whereby the pressure of steam in the vulcanizer was made to automatically regulate the flow of gas or vapor to the burner, and thus regulate the flame, in order to maintain a substantially-uniform pressure in the vulcanizer.

F represents a chamber, in which is mounted a flexible diaphragm, G, which divides the chamber into two compartments. To the lower of these compartments the steam from the vulcanizer is admitted through a duct or passage-way consisting of the pipes H H' H$^2$. The pressure of steam thus acting on the lower face of the diaphragm causes it to rise or fall accordingly as the pressure increases or diminishes.

K is a removable metallic plug or block closing the upper end of the burner-tube, and through which is the needle-orifice *k*, from which escapes the vapor to be burned.

J is a valve-rod carrying at its upper end a needle-point, *j*, which is adapted to pass through the orifice *k* and regulate the flow of gas through it, it being so connected with the diaphragm G that, as the latter rises and falls, the valve-rod is carried up and down, and thus more or less closes orifice *k* as the pressure of steam in the vulcanizer increases or diminishes.

*k'* is a spring coiled around the rod J and bearing against some stationary part of the burner, it serving to insure that the said rod shall follow the diaphragm as it descends.

In the aforesaid patents the valve-rods which carried the needle-points were shown as permanently attached to the diaphragms. It has been found that such constructions are in some respects objectionable, because of the difficulty in removing the said rods for the purpose of cleaning them should they become sticky or gummy and fail to move freely, or should the needle-point become broken and a new one required. In order to overcome this difficulty we have devised and herein shown means for loosely and detachably connecting the valve-rod with the diaphragm, whereby, while it freely moves with the latter, it may be readily removed from the burner-tube whenever occasion requires.

In order that the valve-rod and its needle-point may be properly centered relatively to the burner-orifice, we mount a block, L, having a conical depression, l, directly below said orifice, and in this depression rests loosely the lower end of the valve-rod, which is tapered or pointed, as at $j'$; but while this construction is considered most advantageous, as it insures that the valve-rod shall be properly centered, still we do not wish to be limited thereto, so long as there is a loose detachable connection between the said rod and the diaphragm.

It is sometimes desirable that the needle-valve should have a greater throw than is given thereto by the direct rise and fall of the diaphragm, and we have devised a construction whereby this may be attained and whereby at the same time may be effected a vertical adjustment of the needle-valve irrespective of the movements of the diaphragm. This we accomplish by interposing between the diaphragm and the needle-valve one or more levers, arranged as hereinafter described. In Fig. 4 we have illustrated such a construction in which but a single lever is employed, and wherein the burner is shown as mounted over one side of the chamber F, instead of centrally, as in Fig. 3. M represents a lever, pivoted at m to a block rising from the upper face of the diaphragm. At one end this lever is shown as provided with the block L, in which rests the lower end of the valve-rod, while at or near the other end it bears against an abutment or stop consisting of the adjusting-screw N. From an examination of this figure it will be seen that the up-and-down movement of diaphragm G will cause a corresponding movement of the valve-rod J, and that when the parts are in the positions shown in Fig. 4 the movement of rod J will be about twice as great as the rise and fall of the diaphragm. The relative extent of the movements of these two parts may be varied, should it be found necessary, by providing the upper plate of the chamber F with a series of screw-threaded apertures arranged on a line parallel with lever M, with any of which apertures the screw N is adapted to engage, thus bringing the fulcrum around which the lever M moves nearer to the rod J, which increases its relative movement, or removing it farther therefrom and correspondingly diminishing its movement. When the screw-rod N is not in engagement with the apertures, they are closed by screw-threaded plugs n.

When a comparatively low pressure is desired to be maintained in the vulcanizer, it becomes necessary, if the apparatus is to automatically regulate the pressure, that a given pressure of steam should cut off the flow of vapor to a greater extent than when a higher pressure is to be maintained, and vice versa when a higher pressure is required in the vulcanizer. By the use of the adjusting-screw N we are enabled to so regulate the position of the valve-rod J that a uniform high or low pressure may be maintained within the vulcanizer. By screwing down the adjusting-screw N, and consequently elevating the needle-point $j$, a less pressure of steam will be required to cut off the flame than when the screw is raised and the needle-point allowed to fall, as will be readily understood without further explanation.

Various combinations of levers in lieu of the single lever shown in Fig. 4, may be employed and will readily suggest themselves to those familiar with the art, one form in which two levers are employed being shown in Fig. 5. In said figure, M represents a lever connected to diaphragm G at m and pivoted at one end to a second lever, M', which in turn is pivoted at one end to the wall of the chamber F, and carries at or near the other end the seat for the valve-rod J. The adjusting-screw N in this case bears against the end of lever M opposite to its pivotal point $m'$.

It will be seen without further description that with a construction such as last described, as well as with those illustrated in Figs. 3 and 4, that an up-and-down movement of the diaphragm G will correspondingly move the needle-valve. In the last-described construction, however, any movement of the diaphram will affect the needle-valve to a much greater extent than in either of the constructions heretofore described.

Whenever a lever is interposed between the diaphragm and the needle-valve, it is not necessary that it should be pivoted or otherwise permanently connected to the diaphragm, the construction shown in Fig. 5 having the lever M provided with a downward-extending projection which merely rests loosely upon the upper face of the diaphragm.

The construction shown in Fig. 5$^a$ differs but little from that shown in Fig. 5. In said figure, however, the lever M is shown pivoted to an upright rising from the diaphragm G, while the lever M' is provided with a bearing-point, $m^2$, which engages loosely with the inner upper wall of the chamber F.

In constructions heretofore known and in use, wherein there was a connection between the vulcanizer and the flame-regulating devices, whereby the flame was automatically controlled, it has been practically impossible to employ vulcanizers A of different sizes in one and the same frame without reorganizing or changing the parts to a considerable extent, which has been both troublesome and expensive; but we have devised a construction whereby vulcanizers which vary considerably in size—that is, in their vertical dimensions—may be employed in the same frame, and yet the connection between the interior of the vulcanizer and the steam-chamber F be readily made without necessitating the use of any additional parts or the changing in any wise of the apparatus.

$H^2$ represents a short section of pipe carried by the vulcanizer and adapted to be coupled to the section of pipe H' carried by the frame C by means of a coupling-nut, $h$, in the usual manner. In order that vulcanizers of various heights may be used, and yet insure that they shall be supported at all times at the proper distance from the burner, we make that portion of the steam-passage H' H² carried by the supporting-frame extensible. In Fig. 6 is shown an arrangement of parts whereby this extensibility is permitted. The lower section of tube H is larger than the section H', which latter is adapted to slide into tube H, there being a stuffing-box or other steam-tight connection between the two pipes.

I represents the gland which confines the packing material I', it being provided at the upper end with a smooth aperture, $i$, through which the tube H' passes freely, yet tightly, and at its lower end with an internal screw-thread, as at $i'$, to engage with the threaded upper end of pipe H. We do not wish, however, to be limited to any particular connection between the two parts of the steam-passage so long as it remains extensible.

The above-described devices may be used with an elevated tank or reservoir, O, in which the burning fluid is stored and from which it is conducted to the burner through a pipe or tube, O'; or it may be used with that class of heating devices known as "air-stoves," in which a volume of air under pressure is employed for feeding the hydrocarbon liquid upward to the burner, such a construction being illustrated in Fig. 2 at P.

We will now describe an arrangement of devices whereby the pressure of gas or vapor may be cut off and the flame consequently extinguished at a predetermined time.

In the drawings, Q represents a clock mechanism, which may be of any desired construction.

R represents an enlarged extension of the arbor of the minute-hand, it being provided with an external screw-thread.

We will first describe a construction which we prefer to use with an air-stove, and which is illustrated in Figs. 2 and 7. S represents a self-acting valve or cock, which, as shown in said figures, is supported on top of the clock mechanism, and is connected by a pipe or tube, T, (preferably flexible,) with the reservoir P. S' represents a sliding stem, which is operated upon by a spring, S², which, when permitted to act, so moves the stem as to uncover the opening $s$ and allow the air to escape from the reservoir, thus relieving the pressure therein and causing the flame to be extinguished. U represents an arm connecting the stem S' with the time mechanism. At its lower end it is adapted to engage with the thread formed on the enlarged extension of the minute-hand arbor, which, as it revolves, will gradually move or back off said arm until it becomes free from the screw-thread, when the spring S² will be free to act to uncover the opening $s$, and thus extinguish the flame.

In Fig. 8 we have shown a construction wherein a scroll, R', is employed upon the end of the minute-arbor in place of the screw-thread R, and with which the end of arm U engages. In this case the stem may be so formed as to uncover the aperture $s$ by partial rotation, which is given by the spring after arm U has been released from the scroll, the position indicated by the arm after its release from the scroll being indicated by dotted lines.

A self-acting cock or valve of either of the above descriptions, and connected with either a screw-threaded enlargement, R, or a scroll, R', which we consider equivalent and interchangeable mechanical devices, may be employed as well with the form of apparatus having an elevated tank, O, such as shown in Fig. 1, as with an air-stove. In such case certain slight modifications will be necessary; but they will readily suggest themselves to those familiar with the art. For instance, the self-acting valve will be placed at some convenient point in the pipe leading from the tank to the burner, and the stem S' will be so related as to close the vapor-passage rather than uncover an opening; but with such a construction—that is, one having an elevated tank—we prefer the form of time cut-off mechanism shown in Figs. 1, 9, and 10, wherein the ordinary cut-off valve, E, is provided with certain devices whereby it may be made self-acting and connected with a clock mechanism in such manner as to cause it to work automatically.

E' represents a pin projecting from the valve rod or stem E, preferably from near its outer end.

V is a sleeve or collar loosely surrounding the stem of the valve. To this collar is connected one end of a spring, V', which also surrounds the valve-rod E and is connected at its other end to some stationary part.

It will be seen that if the parts be properly placed and the collar turned upon the valve-stem, the tension of the spring will be increased, and that if, when in such condition, the collar be secured to the stem against rotation the spring will tend to rotate the stem and close the passage, and thus shut off the flow of gas or vapor. In order to permit such connection between the collar and stem, the former is slotted at $v$, which slot is adapted to engage with the pin E', as shown in Fig. 1.

We will now describe the mechanism whereby a connection is made between this valve when thus made self-acting and the time mechanism.

W is a lever pivoted to the rear face of the clock and carrying a projecting pin, $w$, adapted to engage with the screw-threaded portion R of the hour-hand arbor. This lever is so arranged that when backed off from the screw-thread it will fall out of engagement therewith, as indicated in dotted lines.

$e'$ is a pin projecting from the hand-wheel $e$ and adapted to be brought into engagement with the upper face of lever W, as indicated in dotted lines, Fig. 9.

The operation of the device is as follows: The spring V' is given the proper tension to turn the stem E, and is connected therewith by sliding the collar so that its slot $v$ shall engage with pin E'. The projection $w$ of lever W is then made to engage with the screw-thread R at the proper point, after which the pin E' is made to rest upon the upper face of the lever W, where it will be held against rotation by the spring. The clock mechanism then being started gradually revolves the screw until the projection w is moved off therefrom, when the lever W will fall, thus freeing the pin e' from its support and permitting the spring to rotate the valve-stem and shut off the supply of vapor.

It is often necessary, even when employing an automatic shut-off mechanism, to extinguish or regulate the flame before the time when the valve will operate automatically. In the construction last described this may be done by pushing back upon the stem the collar, so that the pin E' shall be disengaged therefrom, after which the valve may be operated by the hand-wheel e.

The screw-threaded portion R of the arbor, or the scroll R', may be graduated in such manner that by adjusting the point at which the end of arm U or the projection w shall engage therewith the length of time before the shut-off mechanism shall automatically operate may be accurately determined.

With the above-described devices for regulating both the amount of heat which shall be applied to the vulcanizer and also the length of time during which such heat shall be applied, all combined in one machine, the necessity of an attendant is required only to start the apparatus and properly regulate the parts, after which it will work automatically.

What we claim is—

1. The combination of the vulcanizer, the burner, a chamber, F, a diaphragm, G, situated therein, a passage connecting the vulcanizer with said chamber, and a valve for shutting off the vapor from the burner, loosely connected with and operated by the diaphragm and detachable therefrom, substantially as set forth.

2. The combination of the vulcanizer, the burner having a removable plug in which is situated the vapor-orifice, the chamber F, the diaphragm G, situated therein, a passage connecting the vulcanizer with the chamber F, and a valve for shutting off the vapor from the burner, situated below said plug and loosely connected with and operated by the diaphragm and detachable therefrom, whereby it may be withdrawn when the plug is removed, substantially as set forth.

3. The combination of the vulcanizer, the burner having a vapor-orifice, the chamber F, the diaphragm situated therein, a passage connecting the vulcanizer with said chamber, a valve for shutting off the gas from the burner, loosely connected with and operated by said diaphragm and detachable therefrom, and means, substantially as described, for centering said valve relatively to said vapor-orifice, substantially as set forth.

4. The combination of the vulcanizer, the burner, the chamber F, the diaphragm situated therein, a passage connecting the vulcanizer with the said chamber, a valve for shutting off the gas from the burner, loosely connected with and operated by the diaphragm, and a spring interposed between the valve and some stationary part of the burner, substantially as set forth.

5. The combination of the vulcanizer, the burner, the chamber F, the diaphragm situated therein, a passage connecting the vulcanizer with said chamber, a valve for shutting off the vapor from the burner, a lever interposed between the diaphragm and said valve, and adjusting devices connected with said lever, whereby the position of the valve relative to the burner may be regulated, substantially as set forth.

6. The combination of the vulcanizer, the burner, the chamber F, the diaphragm situated therein, a passage connecting the vulcanizer with said chamber, a valve for shutting off the vapor from the burner, a lever connected intermediately between its ends with the diaphragm and at or near one end with the valve, and an adjusting device with which the opposite end of the lever engages, substantially as set forth.

7. The combination of the vulcanizer, the burner, the chamber F, the diaphragm situated therein, a passage connecting the vulcanizer with said chamber, a valve for shutting off the vapor from the burner, a lever, M', pivoted to the wall of the chamber F, with which lever the said valve engages, a lever, M, pivoted to lever M' and resting upon and operated by the diaphragm, and the adjusting-screw N, substantially as set forth.

8. The combination of the vulcanizer, the burner, the flame-regulating devices, and an extensible tube connecting the vulcanizer with said regulating devices, whereby vulcanizers of different heights may be properly mounted relatively to the flame, substantially as set forth.

9. The combination of a vulcanizer, A, carrying the tube-section $H^2$, the flame-regulating devices, and the extensible tube H H', adapted to be united with tube-section $H^2$ and to connect the vulcanizer with the flame-regulating devices, substantially in the manner set forth.

10. The combination of the vulcanizer, the burner, a self-acting valve or cock for shutting off the flow of vapor to the burner, a clock mechanism having upon the hand-arbor a screw, and mechanism, substantially as described, connecting said screw with the self-acting valve, whereby at a predetermined time said valve may be permitted to operate to shut off the vapor and extinguish the flame, substantially as set forth.

11. The combination of the vulcanizer, the burner, a valve, a clock mechanism, a revolving thread operated by said clock mechanism, and means, substantially as described, operated by said thread, for moving the valve relatively to the valve-seat, substantially as set forth.

12. The combination of the vulcanizer, the burner, a self-acting valve, a clock mechanism having upon the hand-arbor a screw, and an arm, U, carried by the stem of the valve and adapted to engage with said screw, substantially as set forth.

13. The combination of the vulcanizer, a burner, a valve, a rocking or vibrating arm connected with said valve, a clock mechanism, a revolving thread operated by said clock mechanism and engaging with the aforesaid rocking arm, substantially as set forth.

14. The combination of the vulcanizer, a burner, an elevated reservoir from which oil and vapor are supplied to the burner by the gravity of the oil, a valve situated in the passage of the oil and vapor to directly cut off the same, a clock mechanism, and a valve-moving device, substantially as set forth, connected with the clock mechanism, whereby at a predetermined time the valve in the oil and vapor passage shall be caused to close said passage, substantially as set forth.

15. The combination of the vulcanizer, the burner, a valve situated directly in the oil and vapor passage, a clock mechanism, a spring which tends to operate the valve to shut off the vapor, and a reciprocating arm connecting the valve with the clock mechanism, whereby at a predetermined time the spring is permitted to operate the valve, substantially as set forth.

In testimony whereof we affix our signatures in presence of two witnesses.

FRANK H. CHIDESTER.
SIMPSON J. HARMOUNT.

Witnesses:
JOHN F. GARRETT,
JOHN C. LOWE.